US007478469B2

(12) United States Patent
Yong

(10) Patent No.: US 7,478,469 B2
(45) Date of Patent: Jan. 20, 2009

(54) METHOD AND APPARATUS FOR ASSEMBLING A 2-PIECE SKIN DOOR

(75) Inventor: Toong Chuan Yong, Singapore (SG)

(73) Assignee: Malaysia Woodworking (Pte) Ltd, Singapore (SG)

( * ) Notice: Subject to any disclaimer, the term of this patent is extended or adjusted under 35 U.S.C. 154(b) by 617 days.

(21) Appl. No.: 10/520,822

(22) PCT Filed: Apr. 11, 2003

(86) PCT No.: PCT/SG03/00076

§ 371 (c)(1), (2), (4) Date: Jan. 7, 2005

(87) PCT Pub. No.: WO2004/025065

PCT Pub. Date: Mar. 25, 2004

(65) Prior Publication Data

US 2006/0101644 A1 May 18, 2006

(30) Foreign Application Priority Data

Sep. 12, 2002 (SG) ............................ 200205490-6

(51) Int. Cl.

| | |
|---|---|
| ***B21D 39/00*** | (2006.01) |
| ***B21D 53/88*** | (2006.01) |
| ***B23P 11/00*** | (2006.01) |
| ***B23P 11/02*** | (2006.01) |
| ***B60J 5/00*** | (2006.01) |
| ***B62D 25/04*** | (2006.01) |
| ***E04B 1/00*** | (2006.01) |

(52) U.S. Cl. ........................ 29/514; 29/243.58; 29/437; 29/450; 29/520; 29/521; 29/897.2; 52/741.1; 52/745.19; 296/146.5; 296/146.6

(58) Field of Classification Search ................ 29/897.2, 29/521, 520, 514, 450, 437, 243.58; 296/146.5, 296/146.6; 52/656.4, 656.9, 741.1, 745.19, 52/782.11
See application file for complete search history.

(56) References Cited

U.S. PATENT DOCUMENTS

| | | | | |
|---|---|---|---|---|
| 1,574,493 | A * | 2/1926 | Leonard | 49/501 |
| 5,634,628 | A * | 6/1997 | Schuch | 254/331 |
| 5,803,437 | A * | 9/1998 | Paterson et al. | 254/343 |
| 6,622,449 | B2 * | 9/2003 | Smith et al. | 52/656.9 |

* cited by examiner

*Primary Examiner*—David P Bryant
*Assistant Examiner*—Alexander P Taousakis
(74) *Attorney, Agent, or Firm*—Lawrence Y D Ho & Associates Pte Ltd

(57) ABSTRACT

A method and apparatus for assembling a 2-piece skin door comprising a bottom skin (10) and a top skin (20) wherein each of the bottom and top skins' longitudinal edges have been bent and folded to complementarily hem each other in an interlocking manner to form a seam, the method including: holding the bottom skin in an upwardly open pan manner; holding the top skin in an inverted pan manner wherein its folded and hemmed edges are aligned with the corresponding edges of the bottom skin; and pushing the top skin to insert said top skin's folded edge into the bottom skin's corresponding folded edge to form said interlocking seam. The bottom skin may be held securely on a substantially planar surface with securing means. The top skin may be provided with means for pulling it in alignment towards the bottom skin by winch and cable with hook means.

8 Claims, 7 Drawing Sheets

METHOD AND APPARATUS FOR ASSEMBLING A 2-PIECE SKIN DOOR

TECHNICAL FIELD

This invention relates to a method for assembling a 2-piece skin door, particularly a metal door which skins have been pre-formed. It also relates to an apparatus and its various embodiments adapted for carrying out the process.

BACKGROUND OF INVENTION

Metal doors may be fabricated from two or more skins parts. Each of the skins' edges are usually folded to form a profile which would complementarily engage one another to form an interlocking seam.

One example of such metal door construction is shown in FIG. 1 which comprised of a bottom skin (10) and a top skin (20). Conventionally, the edge portions of a completely installed door as shown in the FIG. 1 may be referred to as the stile or longitudinal edge (12, 22) (the latter term is used in this specification) and the rail (14, 24) or the vertical edge (the former term is used in this specification).

The longitudinal edges (12, 22) of the skins are folded in a profile that will complementarily hem or lock each other when engaged. One such example is shown in FIG. 1 wherein the bottom skin's opposing longitudinally edges (12) are each bent upwardly (15) to form the full thickness of the door edge and the ends of the bent portion is folded outwardly to form an downward flange (17) which is flush with the outer door edge.

The top skin's longitudinal edges may be bent downwardly (23) to form less than the full thickness of the door edge. FIG. 1 shows an example of the thickness of the top skin's longitudinal edge to be about half the full thickness of the door edge. The ends of the bent portion is then folded inwardly to form an upward flange (25) which, upon engaging the corresponding downward flange (17) of the bottom skin edge, complementarily interlock with the bottom skin's folded ends to form the door edge seam.

To assemble the two pieces of skins together by slotting in the flanges (17, 25) of the skins into a mutually hemming or interlocking arrangement, one may manually align the edge profiles of the skins end-to-end and push to slot in the flanges. Manual assembly is usually tedious and laborious.

It is therefore the object of the present invention to provide a method of assembling a two-piece skin door in a mechanised or automated manner. It is a further object of the present invention to provide an apparatus for carrying out the method of assembly in an automated or mechanical manner.

STATEMENT OF INVENTION

Accordingly, the present invention provides for a method and apparatus for assembling a 2-piece skin door comprising a bottom skin and a top skin wherein each of the bottom and top skins' longitudinal edges have been bent and folded to complementarily hem each other in an interlocking manner to form a seam, the method including:

- holding the bottom skin in an upwardly open pan manner;
- holding the top skin in an inverted pan manner wherein its folded and hemmed edges are aligned with the corresponding edges of the bottom skin; and
- pushing the top skin to insert said top skin's folded edge into the bottom skin's corresponding folded edge to form said interlocking seam.

The bottom skin's longitudinally edges may bent upwardly to form the full thickness of the door edge and the ends of the bent portion is folded outwardly to form an downward flange which is flush with the outer door edge; and

- the top skin's longitudinal edges are bent downwardly to form less than, preferably half of, the full thickness of the door edge and the ends of the bent portion is folded inwardly to form an upward flange to complementarily interlock with the bottom skin's folded ends to form the door edge.

Preferably, the interlocking seams are provided at diagonally-opposing edges of the assembled door comprising of the top and bottom skins.

The bottom skin may be held securely on a substantially planar surface with securing means. The top skin may be provided with means for pulling it in alignment towards the bottom skin by winch and cable with hook means.

In one embodiment, the pulling means comprises at least a winch capable of winding a cable attached to a bar arranged to push the top skin in alignment towards the bottom skin. Preferably, it is employed in conjunction with a second winch pulling a bar to push the top skin.

In another alternative embodiment, a second winch is substituted with a reversible rotation motor and the cable forms a loop around the distal half of the planar surface so that the pushing bar may be withdrawn from a completely assembled door back to the distal end to enable the next top skin to be placed onto said distal planar surface.

BRIEF DESCRIPTION OF DRAWINGS

The aforesaid objects and advantages of the method and apparatus may be better understood by referring to the following drawings, and its accompanying description of the representative or exemplary embodiments in which.

DETAILED DESCRIPTION OF SPECIFIC EMBODIMENTS

In general, the method according to the present invention for assembling a 2-piece skin door is applicable for those skins wherein the longitudinal edges have been bent and folded to complementarily hem each other in an interlocking manner to form a seam.

It is apparent that many types and arrangements of seam joints are possible. FIG. 1A shows in detail the seam joint (9) of an assembled door edge comprising two skins (10, 20). This arrangement, whereby the longitudinal edge of the respective skins are bent and folded to complementarily hem each other in an interlocking manner to form a seam joint, is also known as the "Pittsburg" or "grooved seam" joint.

Figure 1:
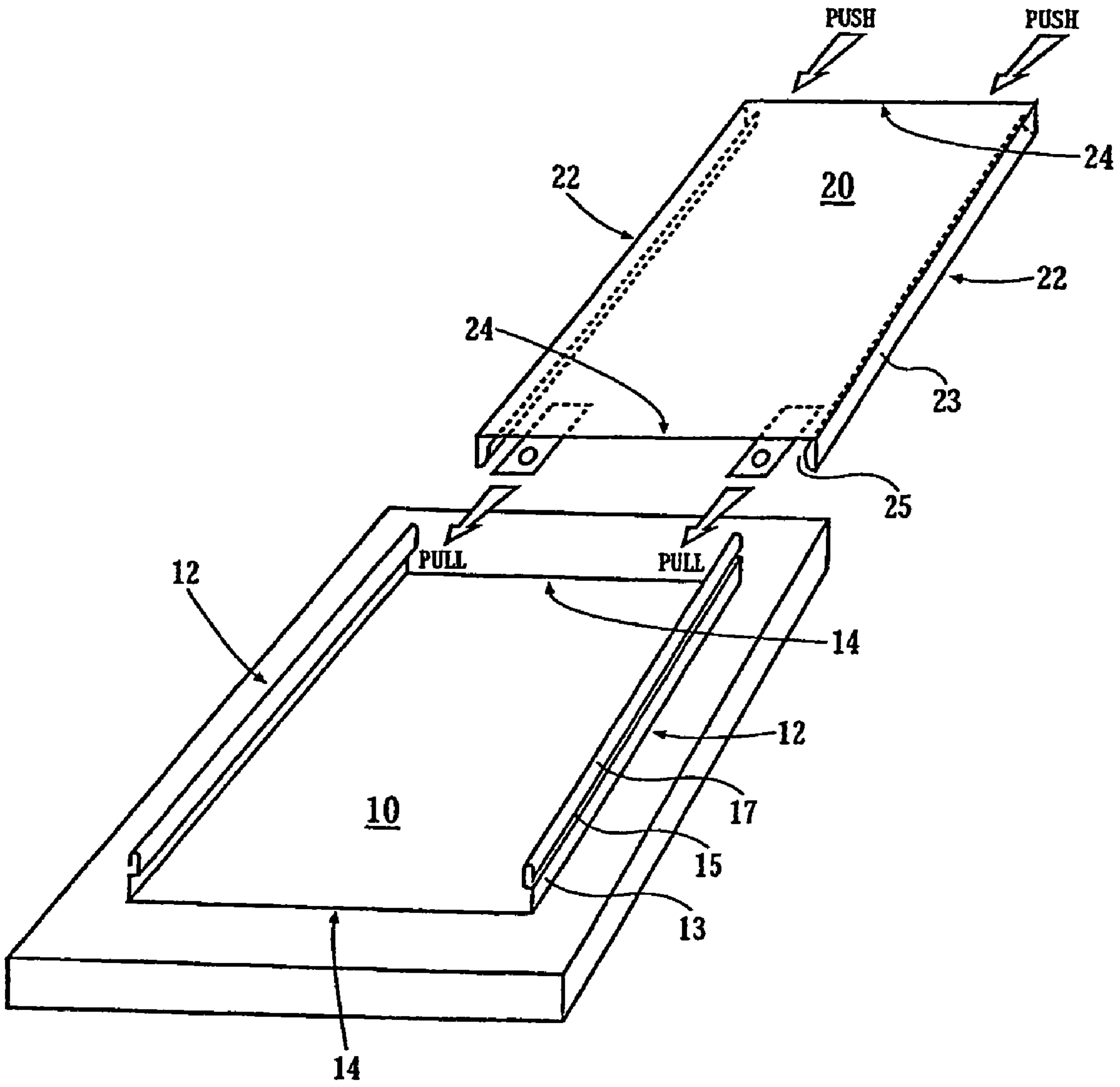
FIG. 1 (discussed in Background of Invention above) shows the parts of a two-piece skin door.
Figure 1A:
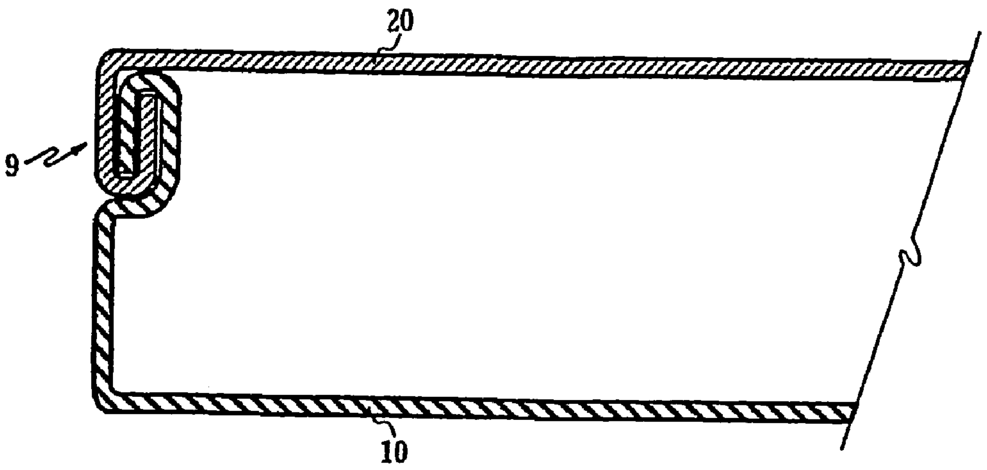
FIG. 1A shows in detail the seam joint of an assembled door edge comprising two skins.
Figure 1B:
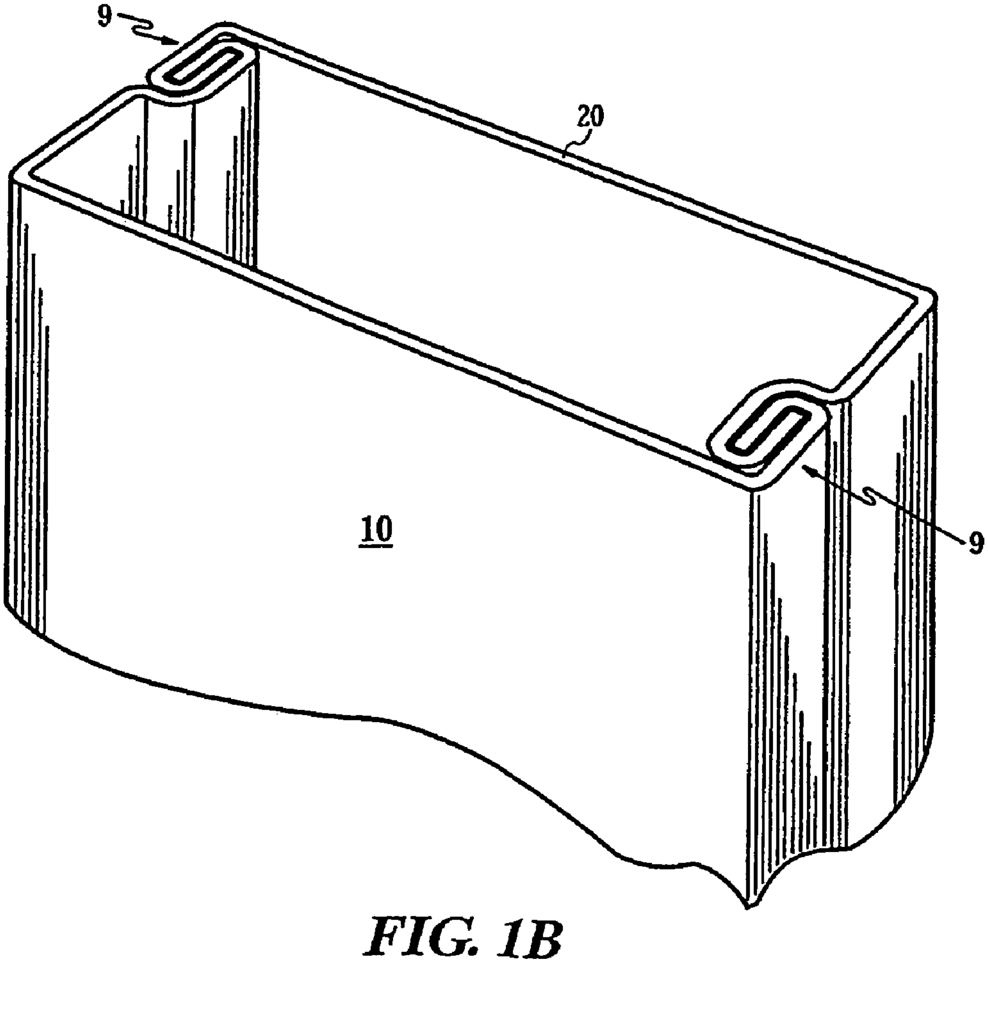
FIG. 1B shows a cross-sectional perspective view of an assembled door comprising two skins and joined at diagonally-opposing edges.
Figure 1C:
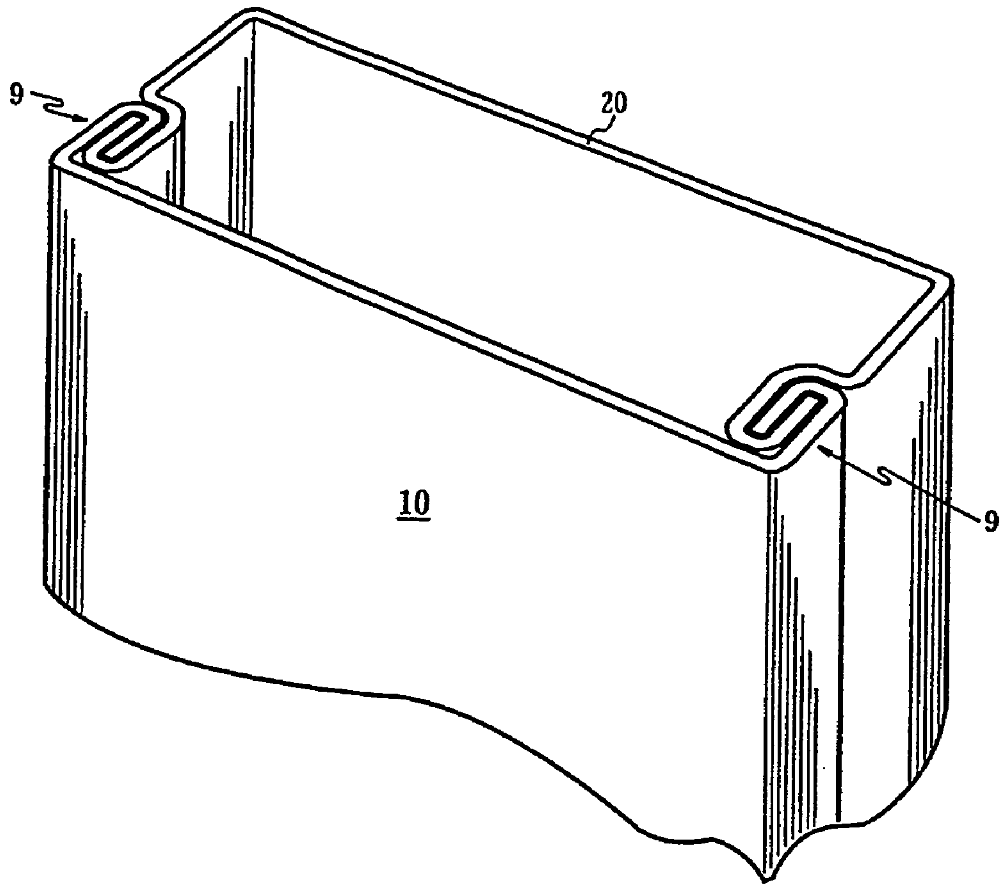
FIG. 1C shows a cross-sectional perspective view of an assembled door comprising a pan skin and cover skin joined at parallel edges.

One preferred example of such joint in a cross-sectional perspective view in FIG. 1B wherein an assembled door comprising two skins (10, 20) is shown joined at diagonally-opposing edges (9). FIG. 1C shows a cross-sectional perspective view of an assembled door comprising a pan skin (20) and cover skin (10) joined at parallel edges (9).

Figure 1D:
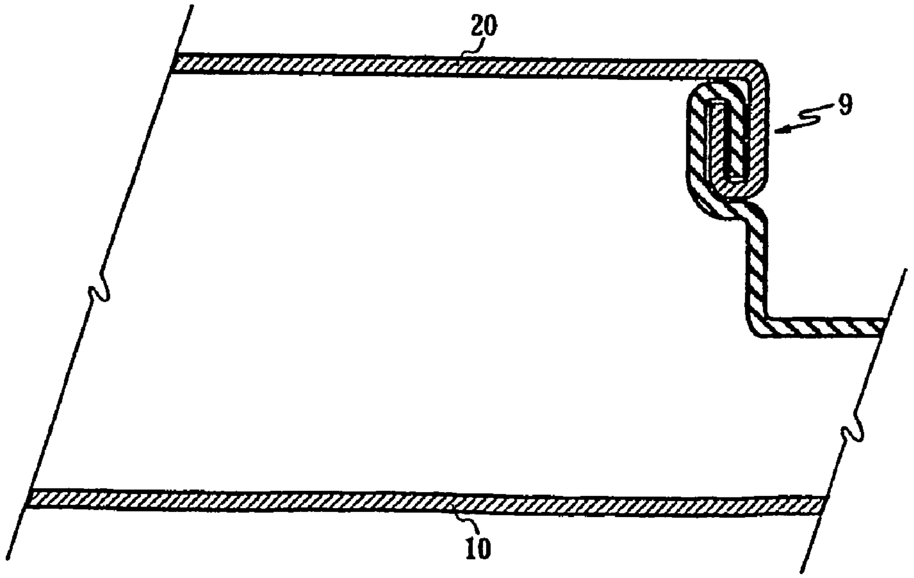
FIG. 1D shows part of an assembled door with a seam joint at a rebate meeting edge.

For a rebate meeting edge of a door, FIG. 1D shows an example in which the mutually hemming or interlocking grooved seam joint (9) may be provided. As shown, the seam joint's folding may be provided to extend so that the folds displace into the door so that the rebate meeting edge's external surface remains flush.

The following embodiments shall use the example of the skin profiles of the bottom skin and top skin as described in the Background of the Invention above, with reference to FIG. 1, i.e.

the bottom skin's opposing longitudinally edges (12) are each bent upwardly (15) to form the full thickness of the door edge; the end of the bent portion is then folded outwardly to form an downward flange (17) which is flush with the outer door edge; and the top skin's longitudinal edges are bent downwardly (23) to form less than the full thickness of the door edge. FIG. 1 shows the thickness to be about half the full thickness of the door edge. The ends of the bent portion is then folded inwardly to form an upward flange (25) which, upon engaging the corresponding downward flange (17) of the bottom skin edge, complementarily interlock with the bottom skin's folded ends to form the door edge seam.

The method generally comprises holding the bottom skin (10) in an upwardly open pan manner and holding the top skin (20) in an inverted pan manner so that its folded and hemmed edges (22) are aligned with the corresponding edges (12) of the bottom skins. In this position, the top skin (20) may then be pushed to insert its folded edges (12) into the corresponding folded edges (12) of the bottom skin (10) to form an interlocking seam of the door edge.

It will be appreciated that the top skin's longitudinal edges may be bent downwardly to form a thickness edge that is less than the full thickness of the door edge. The ends of the bent portion may be folded inwardly to form an inward flange (25) that complementarily interlock or mutually hem the bottom skin's folded ends to form the door edge. FIG. 1 shows the preferable thickness of the top skin's edge, i.e. about half the thickness of the door edge.

Figure 2:
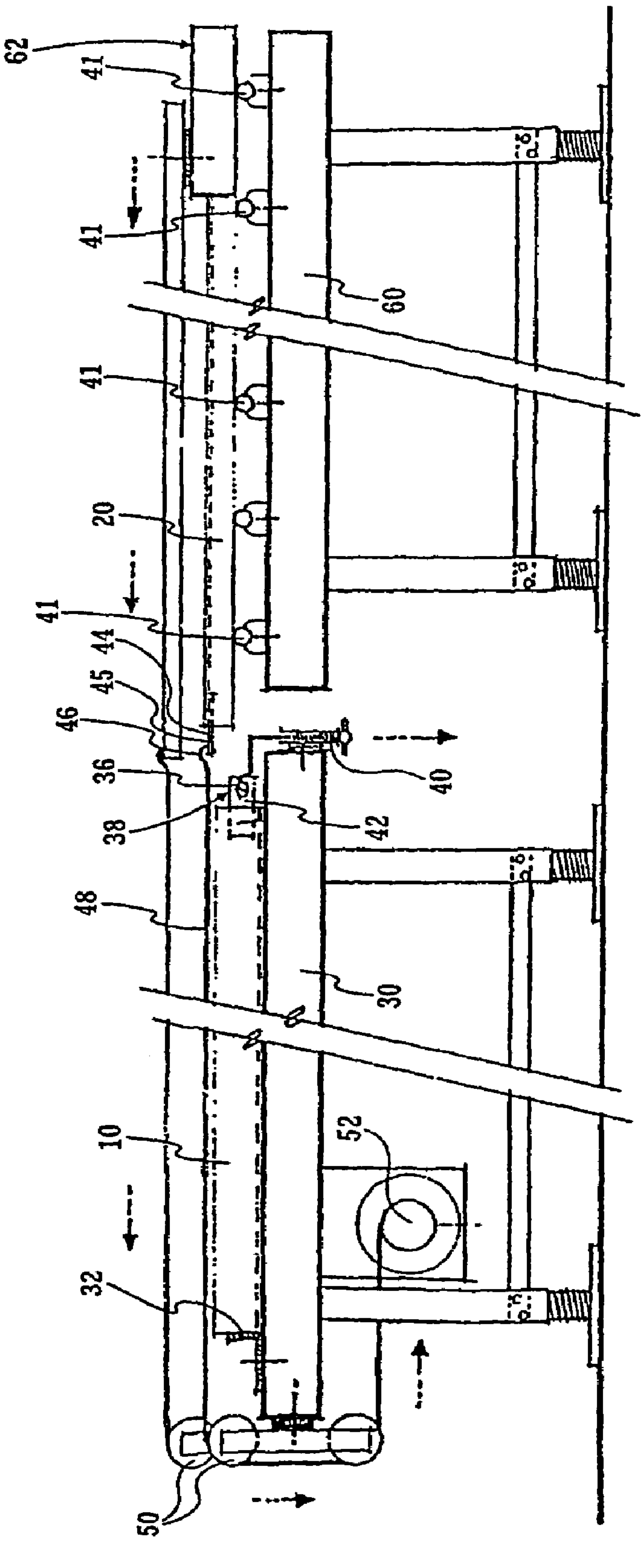
FIG. 2 shows a plan view of an apparatus employing the method of the invention.

For ease of holding the bottom skin (10) in a secure manner, it is preferable that the skin is held on a substantially planar surface such as an assembly bench (30) as shown in FIG. 2 (elevation view) with securing means. The corresponding plan view of FIG. 2 is shown in FIG. 3.

Figure 3:
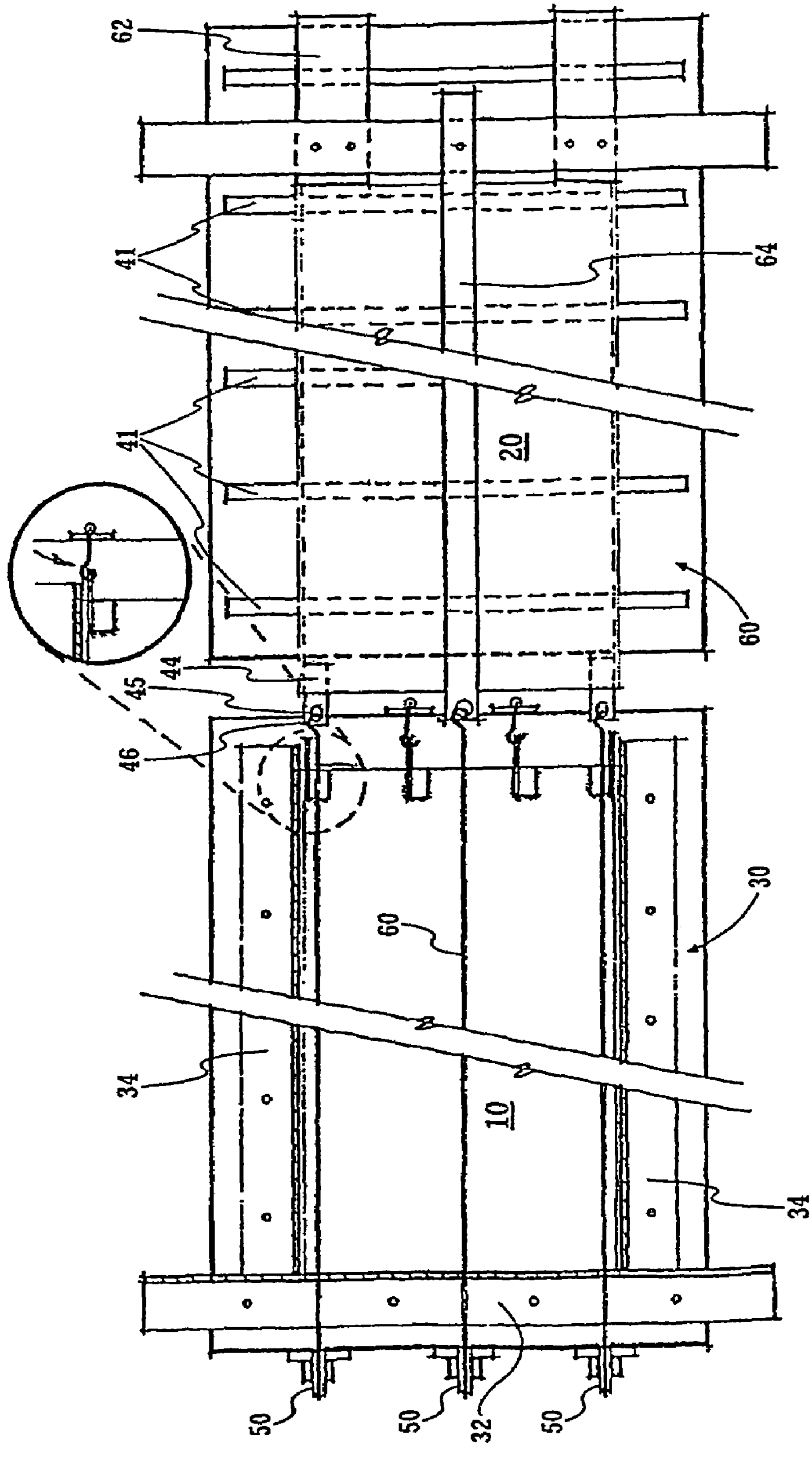
FIG. 3 shows an elevation view of the arrangement of FIG. 2.

FIG. 3 shows one example of the securing means being retaining guides (32, 34) flanking the bottom skin on 3 sides, i.e. on either sides of its longitudinal edges (34) and on the proximal end (32). These guides serve to retain and secure the bottom skin in a fixed position in alignment for the top skin (20) to be pushed to insert the latter's folded edge into the former's folded edge.

The distal rail end of bottom skin (10) may preferably be provided with means to further securely hold that end onto the assembly bench (30). Examples of such securing means may be hook (36) and eyelet (38) means whereby one or more eyelets (38) is provided at the distal rail end and hooked up to a clamp, vise or like means with adjustable screw and handle (40) for tightening or releasing the hook's holding onto the eyelet. The clamp means (40) may be mounted onto the assembly bench (30) at a level below the top skin laid on the assembly bench so as not to obstruct the path of the top skin being moved to be assembled onto the bottom skin. Preferably, the clamp means (40) is mounted belong the assembly bench (30) as shown in FIG. 2.

In another preferred embodiment, a protrusion from the distal rail end of the bottom skin may be provided whereby an eyelet is provided thereon for ease of attaching the hook. The protrusion may be a plate (42) welded onto the rail edge and allowed to protrude therefrom as shown in FIG. 2.

The assembly bench may be provided as a long planar surface with an elongation sufficient to lay down a bottom skin and/or top skin in an end-to-end arrangement including any assembling devices or attachments. Although the drawings herein show separate assembly benches for the bottom and top skins, a combined continuous bench may be used provided openings are allowed in between the laid bottom and top skins for the hook and clamp means (40) and other devices such as pulling cables (described below) to go through.

To facilitate the ease of the laid top skin's movement atop the bench, a plurality roller means (41) may be provided.

Just as in the case of the protrusions from the distal rail edge of the bottom skin (10), similar protrusions may be provided from the proximal rail edge of the top skin. The protrusions may similarly be plates (44) provided with eyelets (45) and welded onto the top skin's rail edge while hook means (46) may be provided to engage the eyelets (45). However, unlike the bottom skin (10) where the plates (42) are used for securing the skin onto the bench (30), the top skin's hook means (46) may be linked to pulling means to pull the skin in alignment with the bottom skin (10) so that the latter's folded edge may receive the former's.

As shown in FIG. 2, the hook (46) may be connected to a cable (48) which may be extended over the proximal edge of the bench to thereunder via pulley guides where a pulling device such as a winch (52) may be mounted. The activation of the winch (52) will pull the top skin (20) via the hook (46) and cable (48) towards the bottom skin (10) and insert the top skin's folded edge (22) into that of the bottom skin (12).

In addition to the action of pulling of the top skin forward, pushing action may also be employed to move the top skin towards the bottom skin. This pushing action may be employed either independently (i.e. dispense with the pulling means) or in conjunction with the pulling means.

As shown in FIGS. 2 and 3, a second winch and cable (60) arrangement may be provided to pull an end pushing bar (62) via a T-shape bar (64) which length transcend the elongation of the top skin. The end of the bar (64) may be provided with an eyelet and hook means for enabling the cable to pull the end pushing bar (62) which in turn pushes the top skin.

It will be appreciated that the first and second winching arrangements may be operable using two separate winches as shown in the figures, or using a single winch having extended axle and gear means to work separate pulley arrangements in pulling the top skin and the end push bar separately but in tandem.

Figure 4:
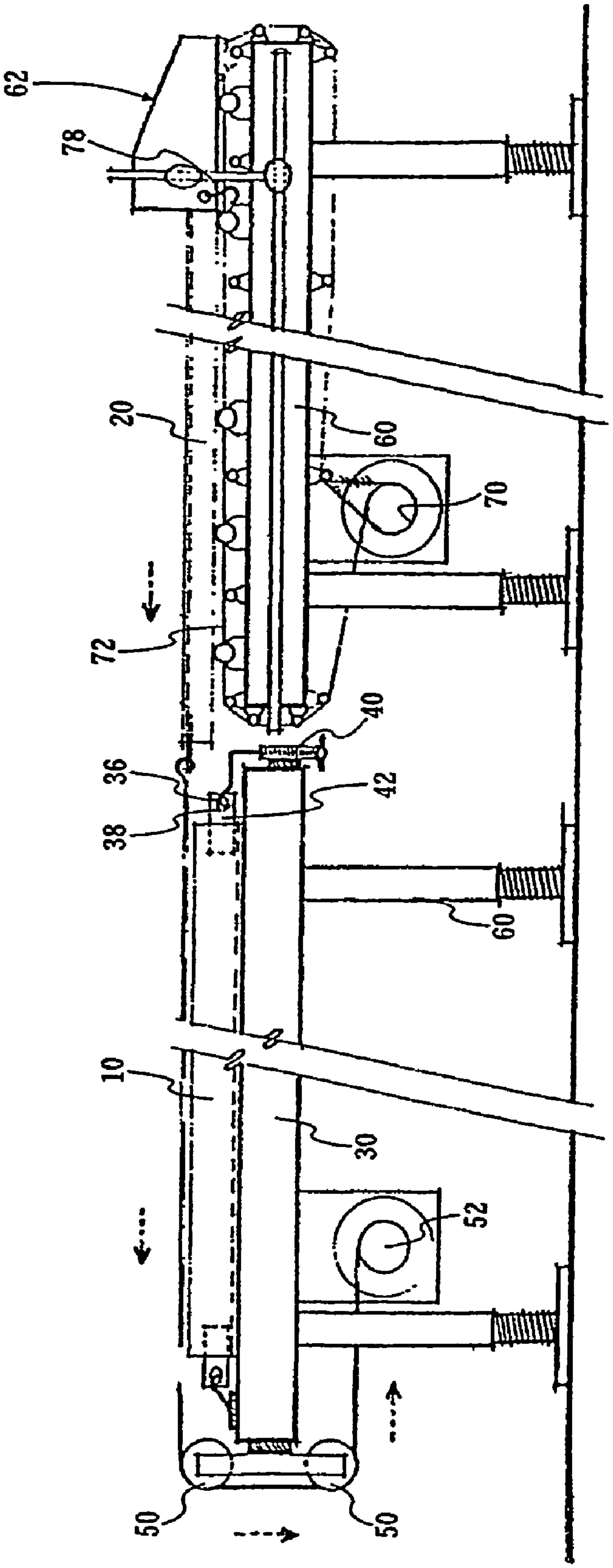
FIG. 4 shows a plan view of another apparatus employing the method of the invention.
Figure 5:
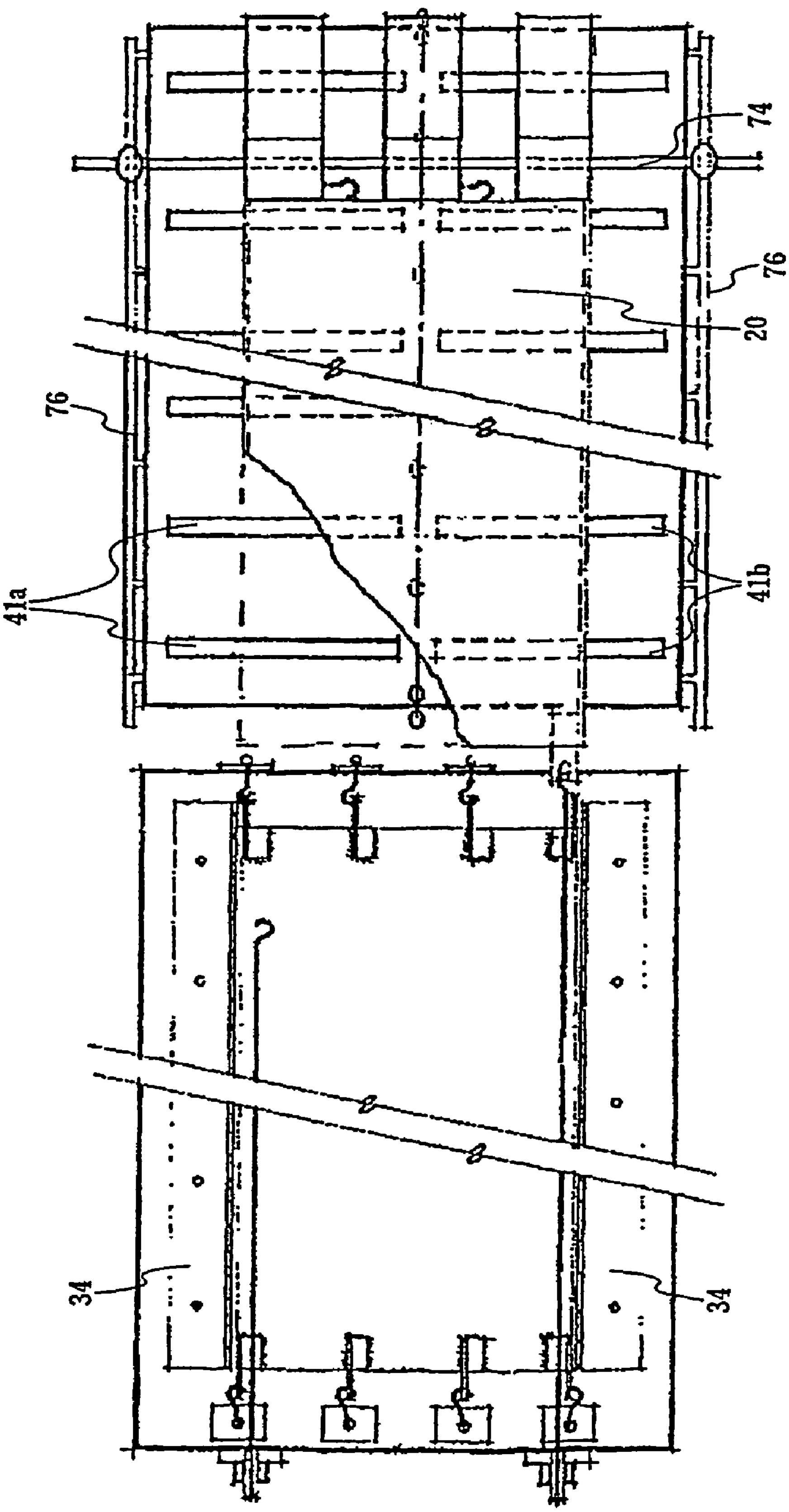
FIG. 5 shows an elevation view of the arrangement of FIG. 4.

Another alternative arrangement for the second winch is shown in FIG. 4 and FIG. 5 in elevation and plan views respectively. In this alternative embodiment, the second winch (70) is mounted below the distal portion of the assembly bench (60) and the cable (72) may be arranged to pull at a level below the top skin being laid on the bench (60). For ease of the cable arrangement to be wound around the edge of the bench by the second winch (70), split bench or separate benches for the bottom and top skins is preferable. The cable (72) may be connected to the end push bar (62) to pull it in order to provide the requisite pushing force on the top skin (20).

As is apparent from the plan view in FIG. 5, the cable (72) may be arranged to extend through the centre of the distal assembly bench. To accommodate the cable (72), the rollers may be split in length so that each row comprises a pair of rollers (41*a*, 41*b*) allowing for a gap in between the pairs for the cable flow to be attached to the end push bar (62). As only one point of attachment or transfer of force is provided by such arrangement, i.e. at the centre of the bar, it would be preferable that the bar (62) be pulled at an even manner to push the distal rail edge (24) of the top skin. To this end, end push bar (62) may be provided with a cross bar (74) which ends are provided with means to slide along rail guides (76) along the longitudinal sides of the bench.

The second winch may be advantageously substituted with a reversible rotation motor and the cable (72) forms a loop around the distal portion of the bench (60) so that the push end bar may be moved in either direction,. i.e. operable to push the top skin towards the bottom skin in the same direction as the second winch, or to withdraw the end push bar (62) by pulling in the reverse direction so that a next top skin may be laid on the bench after the first top skin has been fully assembled onto the bottom skin. The second winch may also be switched off and the end push bar pulled back manually.

The end push bar may optionally be provided with additional hook means (78) which may be employed to separate the bottom and top door skin for whatever reasons, e.g. a jammed, damaged or incomplete assembly of skins. The half- or incompletely-assembled door may be lifted off the bench and turned around with the proximal rail edge of the top skin (i.e. with the protruding plates) towards the end push bar (62). The additional hook means (78) may then be hooked onto plates (44) protruding from the rail edge (24) of the top skin (20). The withdrawal of the end push bar (62) with the additional hooks (78) attached to the protruding plates (44) of the top skin (20) will then pull out the top skin and separates it from the bottom skin (10).

It will be apparent to a skilled person that there is number of alternative ways of achieving the various features of the present invention. For example, the reversible pull of the cable by the second winch may, instead of the above-suggested substitution with a reversibly-operated motor, be provided with gear arrangement for reverse rotation to reverse the direction of the cable pull.

It will also be obvious to a person skilled in the art that the various methods of the present invention and its various specific embodiments and configurations of the apparatus and components thereof may be varied or modified without departing from the above-described method or working principle. These and other such embodiments not specifically described herein are not to be considered as departures from the present invention and shall be considered as falling within the letter and spirit of the following claims.

The invention claimed is:

1. A method for assembling a 2-piece skin door comprising a bottom skin and a top skin wherein each of the bottom and top skin's longitudinal edges have been bent and folded to complementarily hem each other in an interlocking manner to form a seam, the method including:

holding the bottom skin in an upwardly open pan manner to form the full thickness of the door edge and the ends of the bent portion is folded outwardly to form a downward flange which is flush with the outer door edge;

holding the top skin having longitudinal edges that form about half the thickness of the door edge in an inverted pan manner wherein its folded and hemmed edges are bent downwardly to form less than the full thickness of the door edge and the ends of the bent portion is folded inwardly to form an upward flange aligned with the corresponding edges of the bottom skin; and pushing the top skin to insert said top skin's folded edge into the bottom skin's corresponding folded edge to form said interlocking seam and thus the door edge;

wherein the top skin comprises at least a protrusion from a rail edge of the top skin, where pulling means is operable to fasten onto the protrusion for pulling the top skin in alignment towards the bottom skin.

2. A method according to claim 1 wherein the bottom skin is held on a substantially planar surface and secured thereon with at least one securing means; the at least one securing means is fastened onto at least one protruding plate welded onto the inside of the bottom skin and further provided with eyelets from rail edges of said skin for hook means to fasten thereunto.

3. A method according to claim 1 wherein the protrusion is a protruding plate welded onto the inside of the top skin and provided with eyelets for hook means to fasten thereunto.

4. A method according to claim 3 wherein the pulling means comprises at least a winch capable of winding a cable attached to said hook means to pull said top skin.

5. A method according to claim 1 wherein the pulling means comprises at least a winch capable of winding a cable attached to a bar arranged to push the top skin in alignment towards the bottom skin.

6. A method according to claim 4 or 5 wherein a first winch pulling the top skin is employed in conjunction with a second winch pulling a bar to push said top skin.

7. A method according to claim 6 wherein the second winch is mounted distal to the full length of the bottom skin underneath the planar surface which provides for a break in the surface for the flow of cable being winched by said second winch.

8. A method according to claim 7 wherein the second which is substituted with a reversible rotation motor and the cable forms a loop around the distal half of the planar surface so that the pushing bar may be withdrawn from a completely assembled door back to the distal end to enable the next top skin to be placed onto said distal planar surface.

* * * * *